March 20, 1945.  W. H. McCLURE ET AL  2,371,635
GLIDER PICK-UP DEVICE
Filed Sept. 8, 1942  2 Sheets-Sheet 1
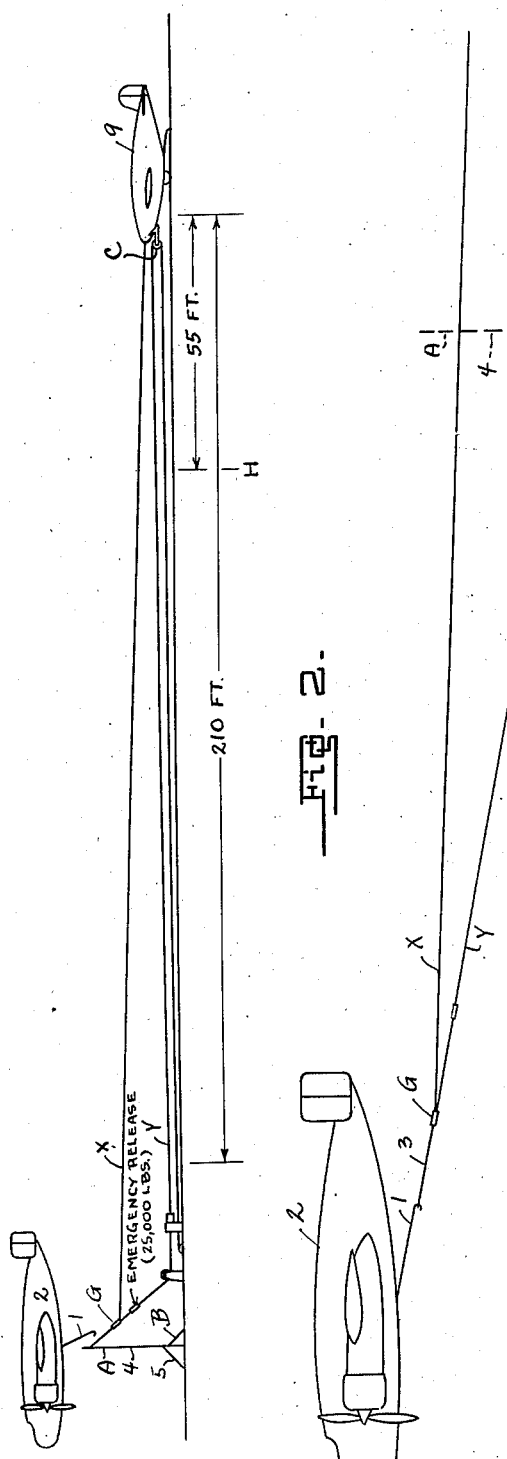
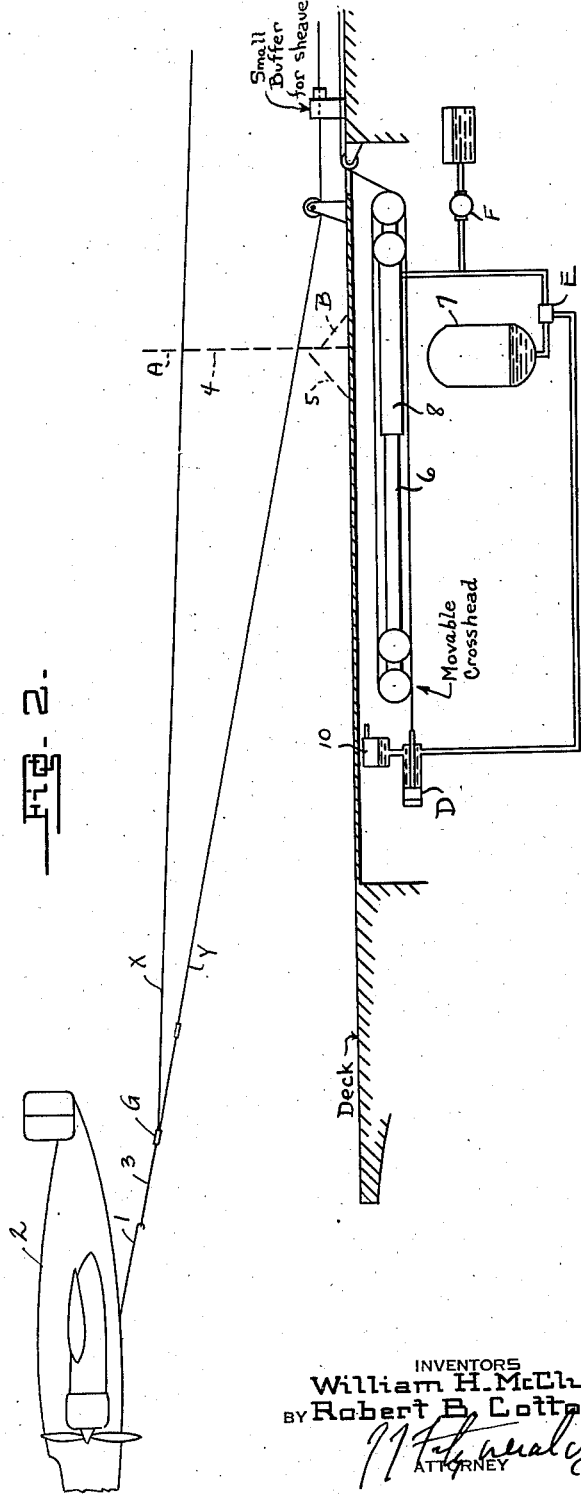
INVENTORS
William H. McClure
BY Robert B. Cotton
ATTORNEY March 20, 1945.　　W. H. McCLURE ET AL　　2,371,635
GLIDER PICK-UP DEVICE
Filed Sept. 8, 1942　　2 Sheets-Sheet 2
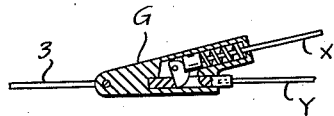
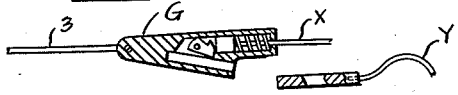
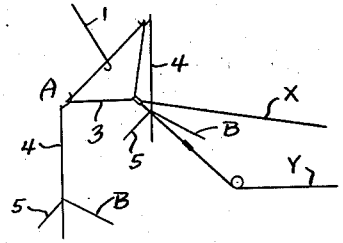
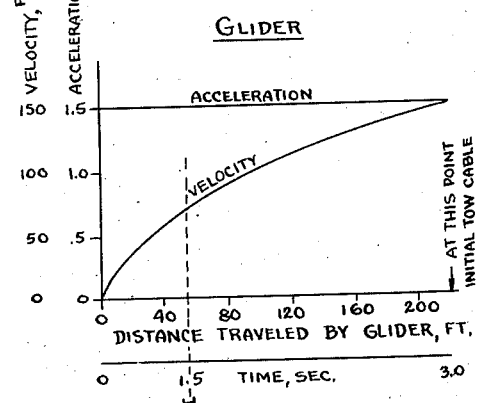
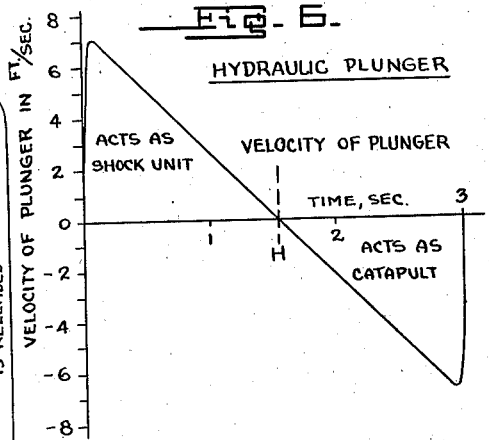
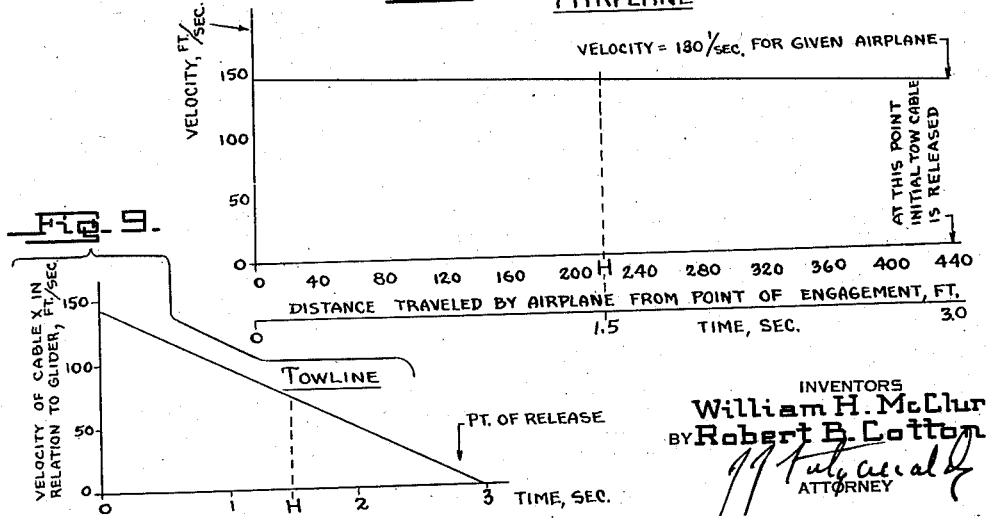
INVENTORS
William H. McClure
BY Robert B. Cotton
ATTORNEY Patented Mar. 20, 1945

2,371,635

UNITED STATES PATENT OFFICE 2,371,635

GLIDER PICKUP DEVICE

William H. McClure, United States Navy, and Robert B. Cotton, Drexel Hill, Pa.

Application September 8, 1942, Serial No. 457,685

12 Claims. (Cl. 244—63)

(Granted under the act of March 3, 1883, as amended April 30, 1928; 370 O. G. 757)

The invention herein disclosed is an arrangement of devices whereby an airplane in flight is enabled to pick up a glider from a position of rest on the ground or on the flight deck of a carrier or other level space having a limited runway.

One of the objects of this invention is to be able to take a glider in tow by a moving plane without seriously affecting its flight during the pickup.

Another object is to be able to do this with a steady and not excessive acceleration of the glider, using a minimum of apparatus which has to be carried aloft by either plane or glider other than the necessary tow line.

A further object is to pick up a glider from the ground by a plane in flight with the least expenditure of energy and without shock.

A still further object is to provide apparatus whereby the force transmitted from an airplane in flight to a glider on the ground may be maintained at a predetermined constant, until the speed of the glider reaches that of the plane, whereupon the apparatus is released and the glider towed thereafter directly by a separate towline.

A still further object is to reduce the force transmitted from an airplane to the glider which it is to pick up to one half of that necessary to give the glider a predetermined acceleration, by temporarily supplying the other half thereof by means on the ground until the speed of the glider reaches that of the plane.

A still further object is to provide safety features for the apparatus above referred to, to avoid excessive strain at either the plane or the glider attachments.

Further objects will assert themselves as the description of this invention proceeds, having reference to the accompanying drawings, in which:

Fig. 1 illustrates one form of the general layout of the lines preparatory to launching.

Fig. 2 shows diagrammatically on a larger scale some of the apparatus used in connection with the above layout, and the plane an instant after its Fig. 1 position.

Fig. 3 is a perspective view of the poles and arrangement of the cables with respect thereto preparatory to being picked up by the hook on the airplane, Figs. 4 and 5 are enlarged views of the release mechanism shown at G in Fig. 1, prior to and immediately after release, respectively, and Figs. 6 to 9 are curves showing the characteristics of one design of the apparatus operating in accordance with one given set of conditions as an example to illustrate the operation of the device.

Referring more particularly to the drawings, the hook 1 attached to airplane 2 engages cable loop 3 at a 20 ft. span shown at A. As the cable is engaged, the standards 4 are released at B and are pulled to the ground by the shock cords 5. The load is transmitted through cable Y around the sheave at C back to and around the sheaves of a hydraulic plunger 6 to the anchor dashpot shown at D. The load in the cable Y increases the pressure in the dashpot which opens a spring loaded valve at E. This opens an accumulator 7 loaded with high-pressure air and oil to the hydraulic cylinder 8. A relief valve at F limits the peak pressure. The acceleration of the glider 9 is directly proportional to tension in cable Y, which is directly proportional to the accumulator pressure. The glider accelerates at a constant acceleration. From the start until the time that the glider reaches one-half the speed of the airplane, the hydraulic plunger acts as a shock unit and the energy absorbed is stored in the accumulator. At the time the glider reaches half the speed of the airplane, the hydraulic plunger ceases to act as a shock unit and becomes a catapult. At this point H, the velocity of the plunger becomes zero and changes direction as shown in Fig. 1. While cable Y is accelerating the glider to the speed of the airplane, cable X is fed out from a drum in the glider. The velocity of cable X in relation to the glider is shown in Fig. 9. When this velocity reaches a very low value, a governor which is synchronized with the drum causes a trip to lock the drum, which stops cable X with relation to the glider. A tension is therefore created in cable X, which pulls the release at G, which releases cable Y, the initial tow cable. The hook on the airplane contains a spring loaded dashpot to absorb any energy in cable X due to any small differences in speed at point of release. At point of release of cable Y, the sheave assembly and hook at C fall to the ground, and the pressure in the anchor dashpot at D is reduced, which closes the valve at E, thus bringing the plunger 6 to a stop. The plunger is now at the same position as in starting position.

The chief advantages of this glider pick-up method are as follows:

1. The only energy absorbed is the energy lost in friction. All the rest of the energy transmitted from the airplane is useful energy.

2. Nearly constant acceleration of the glider is obtained, as shown in Fig. 7.

3. During acceleration of the glider, the load on the airplane is only one-half the load on the glider, reference Fig. 1.

4. Very little equipment is carried in the airplane or glider, thus the equipment can be used for launching many gliders.

5. The span and runout are small enough to adapt this method to the deck of a ship.

The characteristic curves in Figs. 6 to 9 are based on the assumption that the hydraulic plunger mechanism has a mechanical advantage of approximately 20 to 1, there being ten pulleys or sheaves at each end of the plunger mechanism around which the cable Y is successively passed before it goes to the dash pot D. The airplane speed is assumed to be 100 miles/hr. The pressure in the hydraulic cylinder is so adjusted that the force pulling the glider will be equal to that necessary to give it an acceleration of 1.5 times that of gravity. For a 10,000 lb. glider, this force would be (10,000×1.5) or 15,000 lbs. causing a tension in cable Y of 7500 lbs. With this applied force, the time taken for the glider to reach airplane speed, $$T = \frac{V}{A} = \frac{150}{1.5 \times 32.2} = \text{approx. 3 secs.}$$

and the distance covered by the glider in this time would be $$d = vt = \tfrac{1}{2}at^2 = \frac{1.5 \times 32.2 \times 3^2}{2} = \text{approx. 220'}$$

To supply the cable Y to the sheave at the glider at the rate of 100 miles/hr. at the start, the hydraulic plunger has to assume a speed of $\tfrac{100}{20}$ or 5 miles/hr. which is approximately 7'/sec. As the glider gains speed assuming the airplane maintains close to its original speed of 100 miles/hr., the velocity of this plunger will reduce until at the point H where the glider has attained a speed of half of that of the airplane, the plunger speed will be zero and will then reverse in direction and gradually increase.

If we assume the airplane to weigh 20,000 lbs. the speed of the airplane and glider at the time when the glider reached the speed of the airplane would be $$V_2 = \text{approx. 82 miles/hr.}$$

if no power were added by the engines in the meantime, other than that sufficient to overcome resistance; since the loss in kinetic energy of the airplane is equal to the gain in kinetic energy of the glider:

$$\tfrac{1}{2}M(V_1^2 - V_2^2) = \tfrac{1}{2}mV_2^2$$

$$\frac{20000}{2}\left(\overline{100}^2 - V_2^2\right) = \frac{10000 V_2^2}{2}$$

$$2 \times \overline{100}^2 = 3V_2^2$$

$$V_2 = \frac{\sqrt{2}}{\sqrt{3}} \times 100 \text{ or approx. 82 miles/hr.}$$

or $$\frac{82 \times 5280}{60 \times 60} = 120'/\text{sec.}$$

Actually, with some additional power supplied by the engines during the pick up period, the reduction in the original speed of the airplane could be made somewhat less, as shown in Fig. 8. The accumulator pressure necessary to provide a tension of 7500 lbs. in cable Y is assumed to be 5000 lbs. p. s. i. The capacity should be about 40 cu. ft. in this case in order to maintain a substantially constant pressure. The valve E is set to open when the tension in the cable exceeds 2000 lbs. The relief valve F is set to open at 5500 lbs p. s. i. The fluid in the dash pot control line may be under air pressure of 100 lbs. p. s. i. at 10. The tank at 11 for catching the excess hydraulic fluid may be open to atmosphere.

Other values and dimensions may be used on this apparatus. For example, if the pressure in the accumulator be reduced to 2500 lbs. p. s. i., the following changes would have to be taken into account:

1. The glider runout would be increased to 440 ft.

2. The airplane runout would increase to 880 ft.

3. The tension in the initial tow cable would be reduced to 3750 lbs.

4. The acceleration would be only .75 times gravity.

Changes in the weight of the glider would call for corresponding changes in design to provide the desired acceleration, etc.

Obviously, in actual construction, some additional power losses would have to be considered for overcoming the frictional resistance in the mechanism used and the difference in drag for different types of aircraft.

This invention is not limited to the exact arrangement and relations shown, as obvious modifications may be made therein without departing from the basic essentials illustrated.

This invention may be used by or for the Government of the United States for governmental purposes without the payment to us of any royalty thereon or therefor.

What we claim is:

1. A method of picking up gliders in tow by an aircraft in flight including the transmission of a constant force of a predetermined magnitude from the aircraft to the glider until the latter attains the speed of the former, followed by establishing a towing connection at such distance as exists between the aircraft and the glider at that time.

2. In a glider launching and towing system wherein an aircraft in flight picks up a glider from a position of rest on the ground, a cable, a sheave hooked under the nose of the glider, means for supplying a substantially constant tension at one end of the cable at a distance in front of the glider, the cable being passed around said sheave and the other end of it being stretched forward and hung up to facilitate its being picked up from the air, means on the aircraft for picking up said other end of the cable, a release mechanism in the cable near said other end, a reel in the nose of the glider, a tow line connected to said mechanism and to said reel, means responsive to a predetermined tension in said towline to operate said mechanism to release said cable.

3. In a glider launching and towing system wherein an aircraft in flight picks up a glider from a position of rest on the ground, a cable, a sheave hooked under the nose of the glider, means for supplying a substantially constant tension at one end of the cable at a distance in front of the glider, the cable being passed around said sheave and the other end of it being stretched forward and hung up to facilitate its being picked up from the air, means on the aircraft for picking up said other end of the cable, a release mechanism in the cable near said other end, an emergency release in the cable back of said mechanism, a reel in the nose of the glider, a tow line connected to said mechanism and to said reel, means responsive to a predetermined tension in said towline to operate said mechanism to release said cable.

4. In a glider launching and towing system wherein an aircraft in flight picks up a glider from a position of rest on the ground, a cable, a sheave hooked under the nose of the glider, means located at a distance in front of the glider for supplying a substantially constant tension to the cable, one end of the cable being passed around said sheave and then to the tension supplying means, and the other end of it being stretched forward and hung up to facilitate its being picked up from the air, means on the aircraft for picking up said other end of the cable, a release mechanism in the cable near said other end, a reel in the nose of the glider, a tow line connected to said mechanism and to said reel, means responsive to a predetermined tension in said towline to operate said mechanism to release said cable, means normally allowing the reel to pay out the towline as the distance between plane and glider increases but stopping said reel when the rate of increase of said distance is reduced below a predetermined minimum, thus increasing the tension in the towline to release the cable and cause it and the sheave to fall to the ground.

5. The combination defined in claim 4 in which constant tension supplying means consists of a hydraulic catapult device having a suitable mechanical advantage, and means for maintaining a substantially constant hydraulic pressure therein.

6. The combination defined in claim 4 in which the pick-up end of the cable is looped, said loop being stretched over hooks mounted at the top of spaced poles to facilitate the pick-up.

7. The combination defined in claim 4 in which the pick-up end of the cable is looped, the loop being hung across the tops of a pair of spaced poles to facilitate the pick-up and means for throwing the poles to the ground when the loop is picked up.

8. The combination defined in claim 4 in which constant tension supplying means consists of a hydraulic catapult device having a suitable mechanical advantage, and means for maintaining a substantially constant hydraulic pressure therein, including a pressure accumulator or reservoir for the hydraulic fluid connected to the catapult cylinder.

9. The combination defined in claim 4 in which constant tension supplying means consists of a hydraulic catapult device having a suitable mechanical advantage, means for maintaining a substantially constant hydraulic pressure therein, including a pressure accumulator or reservoir for the hydraulic fluid connected to the catapult cylinder, said connection having a control valve which is normally closed, a dash pot connected by a line to said valve which opens in response to pressure in said dash pot line, the end of the cable at the tension supplying means being connected to said dashpot to transmit a force thereto, and thereby produce said pressure when the cable is picked up by the aircraft.

10. The combination defined in claim 4 in which constant tension supplying means consists of a hydraulic catapult device having a suitable mechanical advantage, and means for maintaining a substantially constant hydraulic pressure therein, including a pressure accumulator or reservoir for the hydraulic fluid connected to the catapult cylinder, said connection having a control valve, which is normally closed, a dash pot connected by a line to said valve which opens in response to pressure in said dash pot line, the end of the cable at the tension supplying means being connected to said dash-pot to transmit a force thereto, and thereby produce said pressure when the cable is picked up by the aircraft, said first mentioned connection also having a pressure relief valve connected thereto with adjusting means for controlling the maximum pressure permitted in the catapult cylinder.

11. Apparatus for picking up a glider in tow by an aircraft in flight, including a cable to be picked up by one end by the aircraft, a sheave on the nose of the glider, a source of constant tension on the ground ahead of the glider in the direction of flight, the other end of said cable being passed around said sheave and then to said source, and means for establishing a towing connection after the cable is picked up and the speed of the glider approaches that of the airplane.

12. Apparatus for picking up a glider in tow by an aircraft in flight, including a sheave on the nose of the glider, a source of constant tension on the ground ahead of the glider in the direction of flight, a cable to be picked up by one end by the aircraft, the other end being passed around said sheave to said source, means for establishing a towing connection after the cable is picked up and the speed of the glider approaches that of the airplane, and means for detaching the cable from the aircraft and the sheave on the nose of the glider.

WILLIAM H. McCLURE.
ROBERT B. COTTON.